United States Patent [19]

Parikh et al.

[11] 4,161,719
[45] Jul. 17, 1979

[54] SYSTEM FOR CONTROLLING SYNCHRONIZATION IN A DIGITAL COMMUNICATION SYSTEM

[75] Inventors: Bipin D. Parikh; Haresh C. Patnaik; Bhagubhai K. Patel, all of Cambridge, Ohio; Prabodh M. Dharia, Des Plaines, Ill.; John J. Kurtz, Cambridge, Ohio; Alfred D. Jenkins, Cambridge, Ohio; Prakash Y. Mahajan, Cambridge, Ohio

[73] Assignee: NCR Corporation, Dayton, Ohio

[21] Appl. No.: 839,481

[22] Filed: Oct. 4, 1977

[51] Int. Cl.² .............................................. H04Q 9/00
[52] U.S. Cl. ............................ 340/147 SY; 178/69.1; 179/15 AF; 179/15 BS; 340/146.1 AB
[58] Field of Search ............... 340/147 SY, 146.1 AB, 340/147 R, 146.1 BA; 178/69.1, 53.1 R; 179/15 BS, 15 AF

[56] References Cited

U.S. PATENT DOCUMENTS

| | | | |
|---|---|---|---|
| 3,946,161 | 3/1976 | Husted et al. | 179/15 AF |
| 3,978,449 | 8/1976 | Sanders et al. | 340/146.1 AB |
| 4,002,845 | 1/1977 | Kaul et al. | 179/15 BS |
| 4,016,368 | 4/1977 | Apple, Jr. | 179/15 BS |
| 4,048,440 | 9/1977 | Peck et al. | 179/15 AF |

*Primary Examiner*—Donald J. Yusko
*Attorney, Agent, or Firm*—J. T. Cavender; Stephen F. Jewett; Edward Dugas

[57] ABSTRACT

A technique and implementation of generating and supplying synchronization and error checking signals to a serially transmitted data stream includes the generation of flag bytes which define the end boundaries of the serial data stream, an abort character for aborting the transmission of a frame of data in response to certain conditions, and a diagnostic evaluation character inserted into the data stream. In addition, the invention provides a technique for ensuring that the unique binary code by which a flag byte is defined occurs in the transmitted data stream only where intended. The flag code has been chosen to contain a prescribed number of consecutive one bits, (i.e. — six) flanked by zeroes, and circuitry monitors the contents of a data frame as it is being serialized out for transmission to a remote terminal at times other than during flag transmission. When five consecutive one bits are detected, serializing out of the next bit in the data is interrupted, and a dummy zero bit is inserted prior to the next bit. As a result, the transmitted frame of data will contain no more than five consecutive one bits, except during the flag bytes, (or an abort character) thus ensuring proper synchronization of the end points of the frame.

At the receiver terminal, detection and decoding circuitry also monitors the number of consecutive one's in the received data stream. When five consecutive one's are detected, the receiver decoder circuitry checks to see whether the next bit is a dummy zero bit. If the next bit is a zero bit, it is deleted so that the intended data will be correctly reassembled.

16 Claims, 8 Drawing Figures

SYSTEM FOR CONTROLLING SYNCHRONIZATION IN A DIGITAL COMMUNICATION SYSTEM

FIELD OF THE INVENTION

The present invention relates to a technique and a practical implementation of generating and supplying synchronization and error checking signals to a serially transmitted data stream. The invention particularly addresses itself to the generation of a flag byte which defines the end boundaries of the serial data stream, aborting the transmission of a frame of data in response to certain conditions, and inserting a frame check sequence field into the data stream. In addition, the invention provides a technique of ensuring that the unique binary code by which a flag byte is defined occurs in the transmitted data stream only where intended.

BACKGROUND OF THE INVENTION

Figure 1:
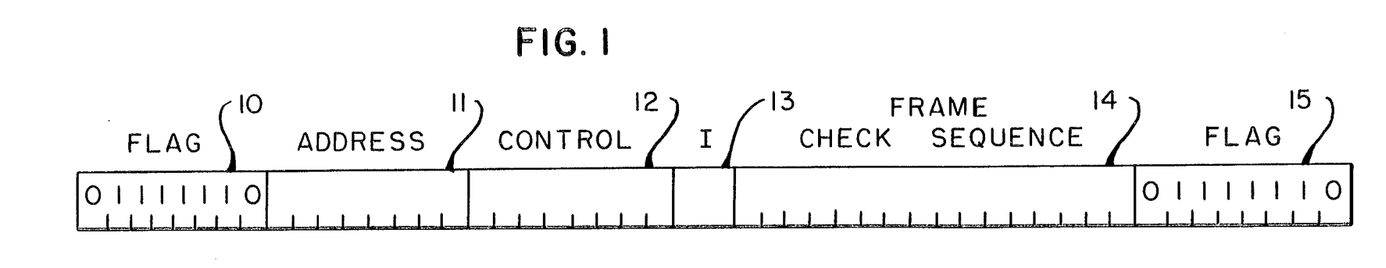
FIG. 1 depicts the format of a frame of data serially transmitted from one terminal to another.

In our co-pending U.S. patent application Ser. No. 839,548, for Digital Data Communications Adapter, filed on even date herewith, there is described a bit oriented multipoint data communication system, which may be advantageously employed for the serial communication of data between processing terminals. As is described therein and as is shown in FIG. 1, each frame of serially transmitted data begins and ends with a unique flag byte, employed by both the transmitter and the receiver terminal for frame synchronization purposes. Since the flag byte is to appear in the data frame only where intended, usually at the beginning and end of the frame, it is extremely important that some means be provided to prevent the flag code from appearing within the address, control, information (I), and frame check sequence (FCS) fields; otherwise the frame would be prematurely terminated.

SUMMARY OF THE INVENTION

According to the present invention, the flag code has been chosen to contain a prescribed number of consecutive one bits, (i.e.—six) flanked by zeroes, and the adapter itself contains circuitry which monitors the contents of the data frame as it is being serialized out for transmission to the remote terminal at times other than during flag transmission. When five consecutive one bits are detected, serializing out of the next bit in the data is interrupted, and a dummy zero bit is inserted prior to the next bit. As a result, the transmitted frame of data will contain no more than five consecutive one bits, except during the flag bytes, (or an abort character to be described below), thus ensuring proper synchronization of the end points of the frame.

At the receiver terminal, detection and decoding circuitry also monitors the number of consecutive one's in the received data stream. When five consecutive one's are detected, the receiver decoder circuitry checks to see whether the next bit is a dummy zero bit. If the next bit is a zero bit, it is deleted so that the intended data will be correctly reassembled.

A further feature of the invention relates to a scheme for aborting the transmission of the frame of data and informing the receiver terminal of the abort. To this end, if certain conditions in assembling the data for transmission are not satisfied, for example, failure of the operation of direct memory access, prescribed abort signals are generated. A first abort signal, termed an abort interrupt signal, advises the processor to which the adapter is directly coupled, via a status register, that the transmission is being terminated. At the same time, the data transmission circuitry is caused to generate a series of eight consecutive one bits as an abort character to be serialized out to the remote terminal. A second abort signal disables that portion of the adapter which would otherwise cause a dummy zero bit to be inserted after five consecutive one bits, as described above, so that the abort transmission sequence of consecutive ones may be transmitted to the receiver terminal, where it is recognized as an abort code, negating the frame.

In addition to providing a technique by way of which flag bytes are generated and detected, how dummy zero bits are inserted into the data stream at the transmitter and detected at the receiver and how abort signals are generated and detected, the present invention further provides for the insertion of a sequence of frame check bits which immediately follows the information field and precedes the terminating flag byte. As data is serialized for transmission, each bit is supplied to a frame check sequence control circuit and a register in which the sequence is generated and stored. Upon completion of an information field, the bits stored in the frame check sequence register are serialized out to the remote terminal, followed by a frame-terminating flag byte. At the receiver, a separate frame check sequence generator monitors the received data frame and generates its own sixteen bit frame check sequence. When the frame-terminating flag is detected, the receiver-generator frame check sequence is compared with that transmitted by the transmitter in order to determine the accuracy of the transmission of the data frame.

DETAILED DESCRIPTION

Frame Format

Figure 2A:
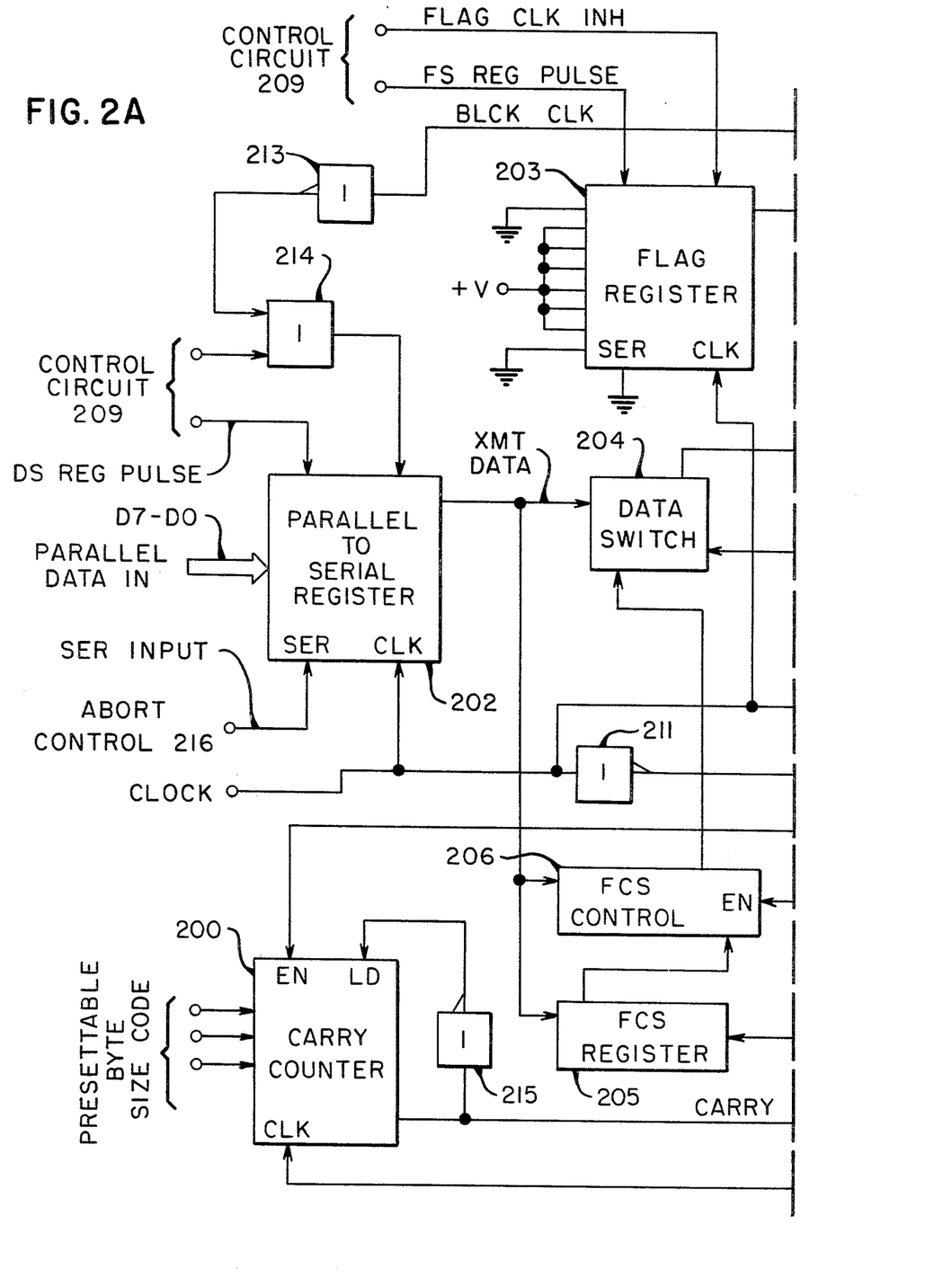
FIGS. 2A and B is a schematic block diagram of a serial data transmitter.
Figure 2B:
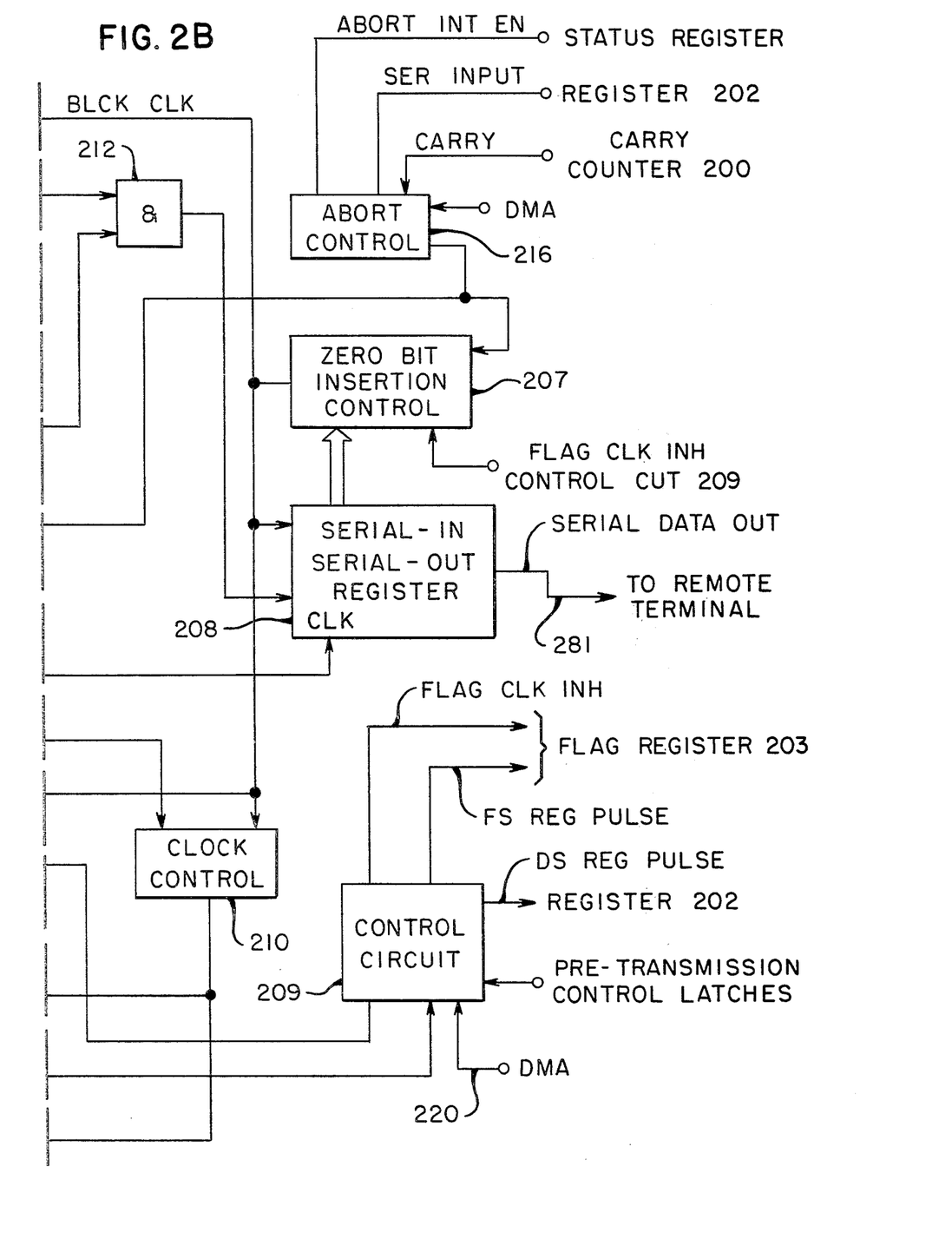

FIG. 1 illustrates the format of a frame of data to which the present invention may be applied. Each frame may consist of a beginning flag byte 10 made up of a prescribed eight bit code (0111 1110), an eight bit address byte 11 which defines the address of a remote receiver, an eight bit control byte 12, an optional information field 13 containing the data to be transmitted, a frame check sequence field 14 for verifying the accuracy of the transmission, and a terminating flag byte 15 identical to flag byte 10. The assembly and transmission of a frame as shown in FIG. 1 will be explained in detail with reference to the implementing circuitry shown in FIG. 2.

Frame Multiplexer-Transmitter

The circuitry shown in FIG. 2 may be incorporated as part of the frame multiplexer circuitry 40 identified in FIG. 1 and illustrated in more detail in FIG. 4 of our above referred to co-pending application; yet, while the environment of this particular adapter is suitable for practicing the invention, it should be understood that other systems which effect digital data transmission over a serial communication link may also incorporate the synchronization, error checking and abort schemes offered by the present invention. Still, for the purpose of providing an exemplary system environment, that described in our above referred to application will be described here also to facilitate the presentation of the invention.

Referring now to FIG. 2, each bit of a frame of data—from the beginning flag byte to the terminating flag byte—is sequentially shifted out from a serial shift register 208 over communication link 281 to the remote terminal. The control of the overall multiplexing and assembly of the entire frame is sequentially controlled by frame transmission control circuit 209. Frame transmission control circuit 209 is coupled to appropriate function pretransmission control latching circuitry, not shown, to which initializing signals have been provided by the terminal processor. Control circuit 209 responds to these initial signals and causes the other components of the frame multiplexer to operate in the proper sequence to assemble and successively multiplex out a frame of data of the format shown in FIG. 1. For this purpose, control circuit 209 is constructed of appropriate combinational logic and timing circuitry, which generates necessary enabling and gating signals at selected times in accordance with a system clock. The particular design of the combinational logic employed may take various forms readily implemented by a skilled artisan, given the sequence of events (described below) which take place during the transmission of a frame. The various signal control lines from control circuit 209 to the respective components of the frame multiplexer are depicted and will be described in conjunction with the interconnection and operation of the system.

As was described above, each byte of the frame is multiplexed out bit-by-bit through serial-in, serial-out shift register 208 over the communication link 281 to the remote terminal. The serial data input of register 208 is connected to an OR gate 212 which is coupled to appropriate circuits from which the contents of the frame of data to be transmitted are obtained. A first input of OR gate 212 is coupled to flag register 203, the inputs of which are hard-wired with the unique flag byte code (0111 1110) described previously. Under the control of gating signal FS REG PULSE from control circuit 209, flag register 203 is loaded with the flag byte (e.g. 0111 1110) to be clocked out through OR gate 212 for serial transmission via register 208.

Information, stored in memory, to be assembled and transmitted, is coupled over the eight parallel data bits D7-D0 from a temporary data storage register successively loaded from the terminal memory with the stored frame bytes to be transmitted. These include address, control and information fields shown in FIG. 2.

The address byte 11, which is to follow the first flag byte 10, is coupled to parallel-to-serial register 202 after generation of the frame-beginning flag byte 10 by flag register 203. Thereafter, register 202 receives the subsequently supplied control field 12 and information (I) field 15.

The contents of lines D7-D0 are loaded into register 202 in accordance with a pulse signal DS REG PULSE from control circuit 209. The DS REG PULSE signal is generated by control circuit 209 in response to the carry output from carry counter 200. Normally, during the assembly and transmission of eight bit-bytes, the presettable byte line inputs to the stages of counter 200 supply the binary number 000 which is caused to be loaded into counter 200 by inverter 215 at each carry. Thus, counter 200 will count up from 000 to 111 and recycle to 000, providing a carry signal every eight clock pulses. (However, carry counter 200 may be loaded with a number other than 000 and caused to recycle in less than eight clock pulse time. Since this is outside of the scope of the present invention it will not be described here. Instead, reference may be had to our above referred to co-pending application for a description of the variable control of counter 200 used when bytes of a size other than eight bytes are to be transmitted.) The output of an OR gate 214 is coupled to another control input of register 202 for selectively inhibiting or enabling the operation of the register. The contents of register 202 are clocked out in sequence at a rate determined by the system clock applied to the CLK input of the register. A further input SER input is coupled to a serial input line. SER INPUT may be generated by abort circuit 216 which causes register 202 to clock out ones continuously during an abort condition.

The serial data output from register 202 is coupled over line XMIT DATA to data switch circuit 204 which is formed of appropriate logic circuitry to effectively multiplex the serial output of register 202 or frame check sequence control circuit 206 to OR gate 212 during prescribed intervals of the frame, other than during the transmission of a flag byte. The output of register 202 is also coupled to frame check sequence register 205 which generates and stores a frame check sequence field in accordance with a preselected function such as a conventional frame check sequence polynomial. This field is supplied to frame check sequence control circuit 206 for insertion into the frame by data control circuit 204 subsequent to the transmission of an information field. Clocking of the register 202 is effected by clock control circuit 210, which receives the system clock inverted by inverter 211. Clock control circuit 210 is a gating circuit which normally couples system timing to various components of the transmitter, except during zero bit insertion to be described below.

From OR gate 212, serialized data is coupled to a serial-in/serial-out register 208, the output of which is coupled over the data link 281 to the remote terminal. Clocking of the data through register 208 is controlled by the system clock. The contents of the stages of register 208 are coupled to zero bit insertion control circuit 207, the output of which is a block clock signal BLCK CLK. The BLCK CLK signal is coupled to a control input of register 208 to controllably inhibit the shifting of the output of OR gate 212 into register 208 during the zero bit insertion operation. Zero bit insertion control circuit 207 is formed of combinational logic for detecting the presence of five consecutive one bits in successive stages of register 208, and thereupon generating a BLCK CLK signal. During the generation of a flag byte (six consecutive ones) and during abort (eight consecutive one bits), zero bit insertion control circuit 207 is disabled by FLAG CLK INH and ABORT EN control signals, respectively. The BLCK CLK signal out of zero bit insertion control circuit 207 is also coupled to clock control circuit 210 and carry counter 200 to inhibit each of these circuits during zero bit insertion. In addition, the BLCK CLK signal is also coupled to register 202 via inverter 213 and OR gate 214 to prevent shifting of data during zero bit insertion, so as to avoid missing the data bit which would otherwise occupy the inserted zero's bit position. OR gate 214 also receives a data clock inhibit signal DATA CLK INH from control circuit 209 for normally enabling register 202.

Abort Circuit

The aborting of the transmission of a frame of data may be responsive to a failure or inability to access data from memory. Specifically, when the system direct memory access control circuit accesses data from memory, it supplies a bus request signal, BRQ, over the control portion of the common control bus (CCB) to the processor.

The DMA control circuit then waits for a bus acknowledgement signal BAK from the CCB. If the BAK signal is not received within a prescribed period of time after generation of BRQ, the frame is aborted. The prescribed length of time is the time required for serializing a byte of data, i.e. one cycle of the carry counter 200 (FIG. 2). The BRQ signal is generated at the beginning of a byte cycle and, via a high speed clock, a delayed bus request signal DEL BRQ is generated to enable one of the input of AND gate 303, shown in FIG. 3.

Figure 3:
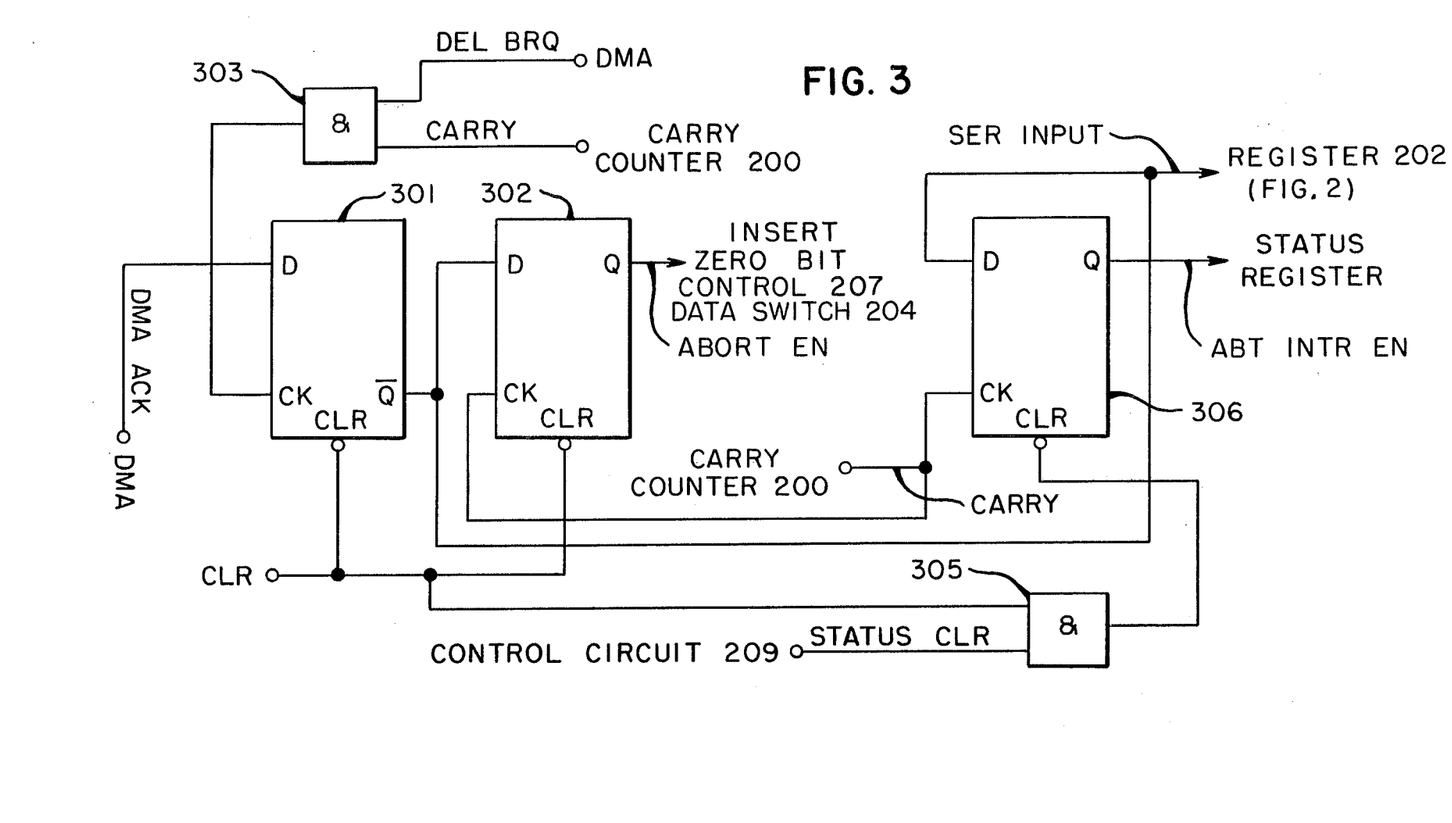
FIG. 3 illustrates the circuitry configuration of the abort signal generating circuitry shown in FIG. 2.

The output of AND gate 303 is connected to the clock input of flip-flop 301. The other input of AND gate 303 is coupled to the carry output of carry counter 200 (FIG. 2). The state input of flip-flop 301 is coupled, via line DMA ACK, to the DMA control circuit which receives the BAK signal from the CCB. The Reset or $\overline{Q}$ output of flip-flop 301 is connected to the state input of each of flip-flops 302 and 306 and also to the serial input line SER INPUT of parallel to serial register 202 (FIG. 2). The clock input of flip-flop 302 is coupled to the carry output of carry counter 200. The clock input of flip-flop 306 is also coupled to the carry output of carry counter 200. A status clear signal STATUS CLR is applied to one input of AND gate 305, the output of which is connected to the clear input of flip-flop 306. The clear inputs of flip-flops 301 and 302 are coupled with the other input of AND gate 305 to receive a clear or reset signal CLR. The set or Q output of flip-flop 302 represents the abort enable condition ABORT EN. The Q output of flip-flop 306 represents an abort interrupt enable condition, ABT INTR EN, to be supplied to the processor as an abort interrupt status indicator.

As was described above, during normal operation of the system, DMA control receives a bus acknowledgement signal, BAK, over the CCB within the byte cycle time governed by the counting cycle of carry counter 200. The BAK signal causes the DMA ACK signal to be high. Accordingly, when carry counter 200 recycles at the end of a byte and generates a carry signal, due to the high level on the state input of flip-flop 301, its output does not change state and each of flip-flops 301, 302, and 306 remains in its initially cleared condition. The levels of the ABORT EN and ABT INTR EN lines remain low so that no abort condition is generated.

However, should DMA control not receive a bus acknowledgement signal BAK within the byte cycle time, the DMA ACK line will be low when a carry signal is generated, causing the $\overline{Q}$ output of flip-flop 301 to change state. This also causes a change in state of each of flip-flops 302 and 306. The change in state of the $\overline{Q}$ output of flip-flop 301 causes a continuous "one" level to be supplied over the SER INPUT line to the serial input of parallel to serial register 202 (FIG. 2). The ABORT EN signal causes data control circuit 204 to lock onto the XMT DATA serial line output of register 202 and inhibits bit insertion circuit 207. A series of eight "one"s is now sent out to the remote receiver as an abort character. The ABORT INTR EN is coupled to the CCB to interrupt the processor and provides a status indication that the ABORT character (11111111) has been transmitted, i.e. the frame has been terminated. Subsequently, the system is reset by a reset or clear signal and is prepared for another frame.

Transmitter Operation

Referring now to FIG. 2, the operation of the transmission of a frame of data will be described.

Initially, whenever the processor of the terminal with which a particular data communications adapter is associated desires to communicate with a remote terminal, it will supply a set of address, data, and control signals on the common control bus. The control bus contains the appropriate read/write (read for transmit mode, write for receive mode) and enable signals. The CCB also couples selected pretransmission control information from the processor by way of the address and data portions of the CCB. These signals are used to initialize the adapter for data transmission including accessing data from memory. Since a description of these operations is not necessary for an understanding of the present invention, it will be assumed that the appropriate control initializing signals have been generated and data to be transmitted is supplied over parallel data lines D7-D0 to register 202. Transmission enable signals are supplied to control circuit 209 which then proceeds to commence a transmission operation.

Beginning Flag Byte Transmission

In response to commence transmission signals supplied from appropriate pretransmission control latches, control circuit 409 generates FS REG PULSE and DS REG PULSE signals. The FS REG PULSE signal causes the 0111 1110 hardwired inputs to flag register 203 to be loaded in parallel. At this time, control circuit 209 also responds to the transmission request by generating a FLAG CLK INH signal which enables the serial shifting out of the loaded contents of register 203 through OR gate 212, while disabling zero bit insertion control circuit 207. As the beginning flag of the frame is being shifted out through register 208 as a serial bit stream to the remote circuit, in accordance with the system clock CLK, the DS REG PULSE signal from control circuit 209 causes the bits of the address byte supplied over lines D7-D0 to be loaded into parallel-in, serial-out register 202.

Address, control, and information field

At the end of the last bit or eighth bit of the flag byte, control circuit 209 causes the FLAG CLK INH signal to go high, disabling register 203 and removing the enabling zero bit insertion circuit 207; the DATA CLK INH signal goes from high to low and, via OR gate 214, enables the serial shifting out of the bits of the address byte stored in register 202. With each carry signal from carry counter 200, new FS REG PULSE and DS REG PULSE signals are generated by control circuit 209 to cause a re-loading of parallel to serial registers 202 and 203. Of course, the contents of register 203 are not serialized out since it is disabled by the lvel of the FLAG CLK INH input at this time.

Data switch circuit 204 applies the address byte serially clocked out of register 202 to OR gate 212 to be coupled to serial-in, serial-out register 208 for transmission.

After the address field is clocked out, the subsequent control field supplied via parallel data bus lines D7-D0 is loaded in register 202 at the next DS REG PULSE and then serially clocked out to the remote terminal in the same manner as described above in connection with the address byte. As the contents of parallel-to-serial register 202 are shifted out, beginning with the transmission of the address field (described above), they are applied to FCS register 205 and FCS control circuit 206, causing an FCS character to be generated and stored in register 205 which will eventually follow the information field. After the control field is clocked out, the bytes of the information field are sequentially read out of memory and successively supplied to register 202 just as were the address and control bytes for transmission.

"0" BIT INSERTION

During the transmission of those portions of the frame, other than the flag byte, zero bit insert control circuit 207 will be enabled, since the FLAG CLK INH signal is high and goes low only during the transmission of a flag byte. If zero bit insertion circuit 207 detects the occurrence of five consecutive one bits as the data is clocked through register 208, a BLCK CLK signal is immediately generated. The BLK CLK signal is generated for one bit time to temporarily disable serial clocking of register 202 via OR gate 214. It also disables FCS register 205, and carry counter 200 via clock control circuit 210. In addition, the BLCK CLK signal forces the first stage of register 208 to load a zero with the next clock pulse so that the five consecutive ones will be immediately followed by an inserted dummy zero bit. At the end of this one bit clock time, the BLCK CLK signal changes state and normal operation of the system is resumed.

Frame Check Sequence Word Transmission

As each word of the information field is serialized out from register 202, it is supplied to FCS control circuit 206 and frame check sequence register 205, which cause a frame check sequence word, to follow the I field, to be generated.

Upon completion of the transmission of the information field, DMA control advises the frame transmission control circuit 204 via line 220, that the reading out of the information field from memory has been completed. This causes frame transmission control circuit 204 to enable FSC control circuit 206 so that the frame check sequence word, which had been generated during the transmission of the address, control, and information fields, may be coupled to register 208 via data switch circuit 204 and OR gate 212. The frame check sequence word is thus sent out in serial form through serial shift register 208 to the remote terminal.

Terminating Flag Byte Transmission

Upon completion of transmission of the frame check sequence, frame transmission control circuit 209 once again disables zero bit insertion circuit 207 by changing the state of the FLAG CLK INH input and enables flage register 203. The next FS REG PULSE loads the flag byte (0111 1110) to be serially shifted out via OR gate 212 and serial shift register 208, indicating a completion of the frame of data.

By way of a connection not shown, frame transmission control circuit 209 generates an appropriate end of frame status interrupt signal to be coupled over the processor via the CCB.

Receiver Terminal

Figure 4A:
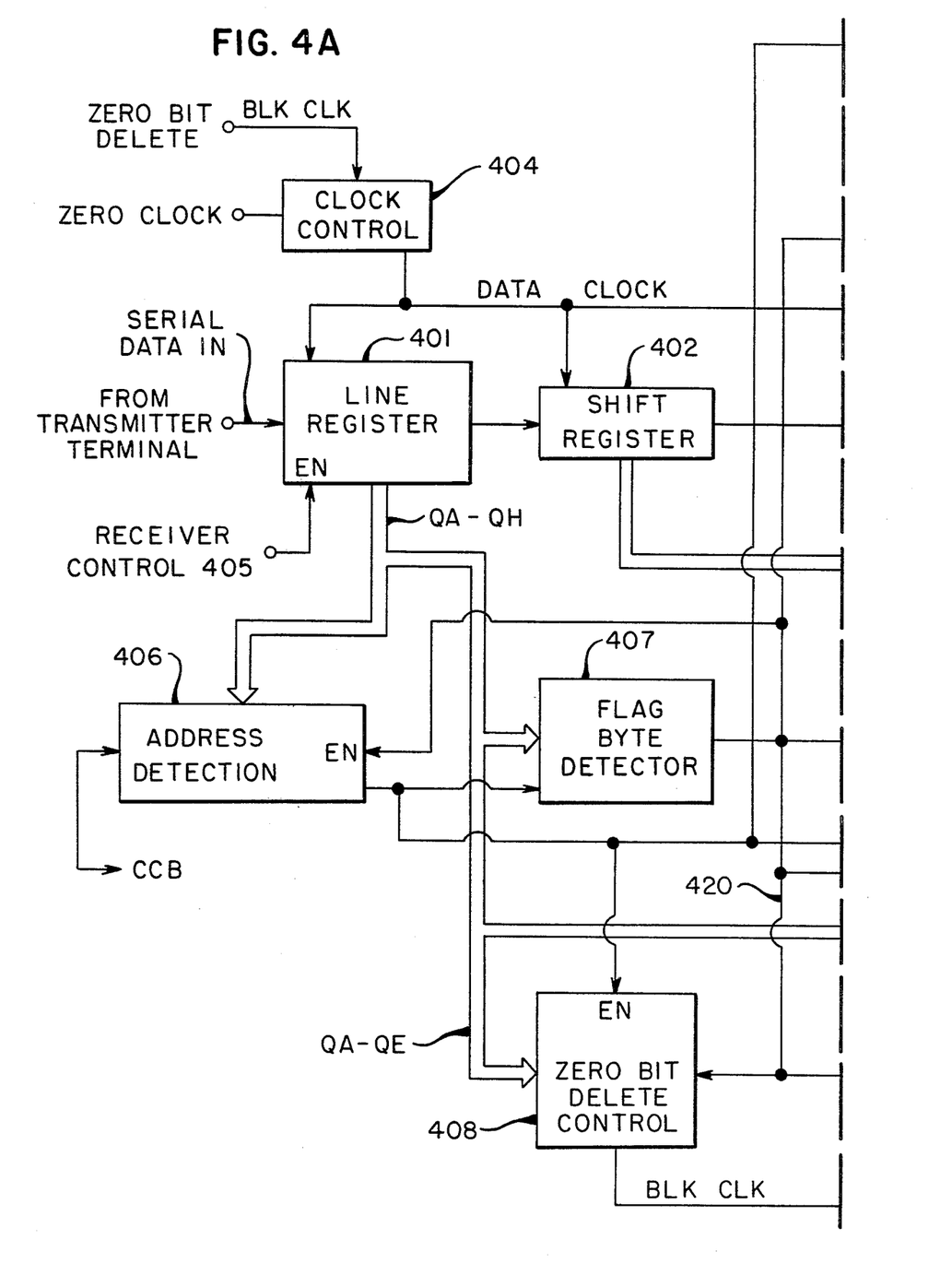
FIGS. 4A and B is a schematic block diagram of a serial data receiver.
Figure 4B:
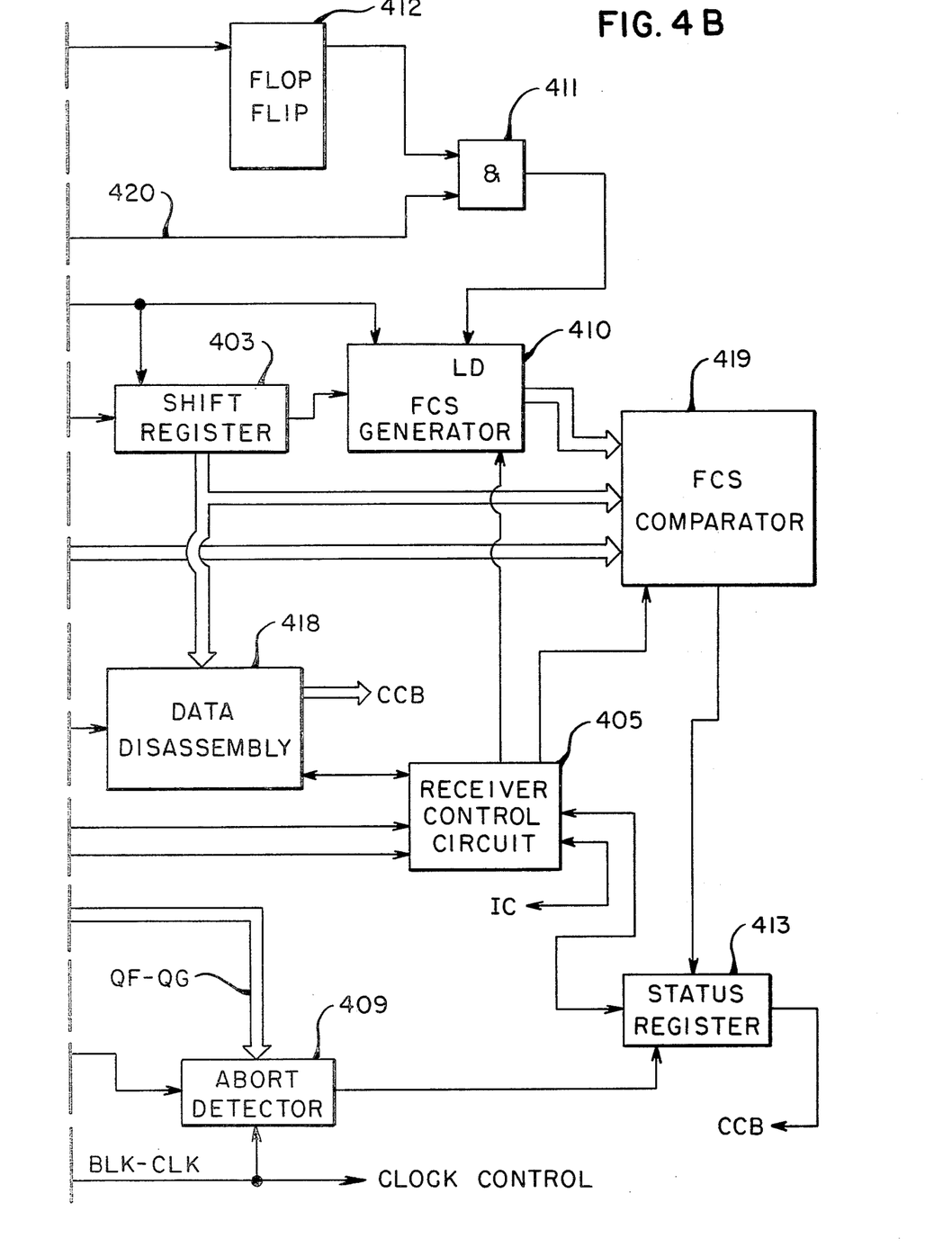

At the receiver terminal, shown in FIG. 4, the serial communication link to which the adapter is coupled is monitored, once the receiver has been initialized by its associated processor to check for a frame of data transmitted to it from a remote transmitter terminal. The configuration shown in FIG. 4 illustrates the incorporation of the present invention into an enironment of the type described in our above referred to communication system. To facilitate a description of the invention, however, those components of the receiver a description of which is not necessary for an understanding of the present invention have been illustrated in a simplified block diagram form. As was the case with the frame multiplexer/transmitter, the receiver circuitry is coupled to an associated processor and memory for receiving initializing control signals, and coupling received serial data into memory, as by way of direct memory access.

Figure 5A:
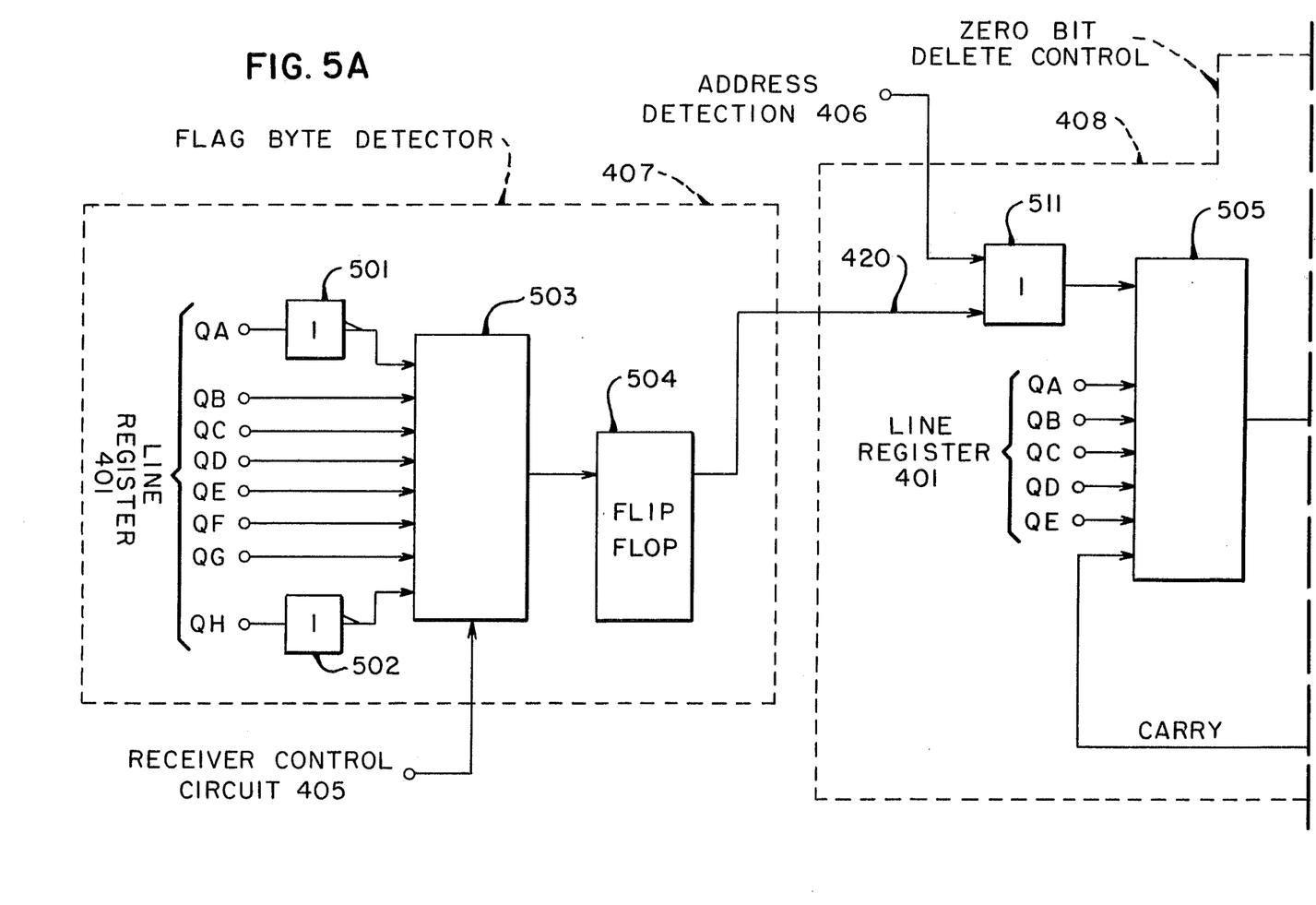
FIGS. 5A and B is a detailed circuit diagram of flag byte detection zero bit detection and abort character detection circuitry.
Figure 5B:
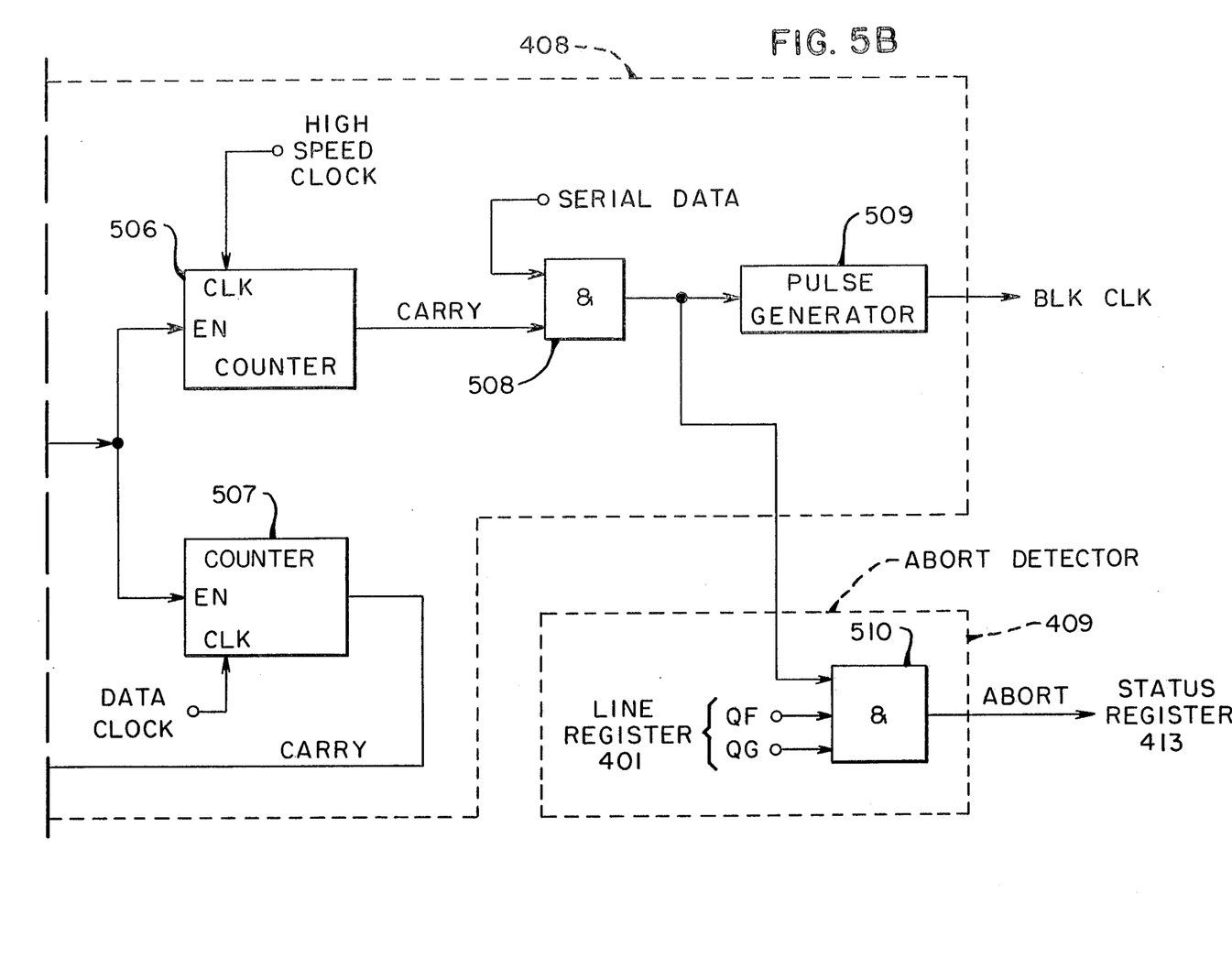

Referring now to the details of the circuitry configuration of the receiver frame demultiplexer, shown in FIG. 4, the serial data link from the remote transmitter terminal is coupled to the input of a line register 401. Register 401 is normally clocked by a clock signal derived from the serial data stream by clock control circuit 404. Clock control circuit 404 receives the line clock and generates a data clock output which is employed to operate the components of the receiver. In the absence of a BLK CLK signal from zero bit delete control circuit 408, clock control circuit 404 couples the line clock as the data clock signal directly for shifting in the data through registers 401, 402, and 403. Line register 401 is a serial-in, parallel/serial-out shift register, the QA-QH outputs of which are monitored for various sync and control purposes, such as flag detection, abort, zero delete enable, and address comparison. Address detection circuitry 406 is enabled by flag detector 407 to compare the byte following flag byte with the address of the receiver; if an address match occurs, address detection circuit 406 informs the receiver control circuit 405 so that monitoring and demultiplexing of data can take place. Flag byte detector 407, the details of which are shown in FIG. 5 to be described subsequently, is coupled to the eight parallel outputs QA-QH of line register 401 and looks for the occurrence of a flag byte in register 401. Whenever a flag byte (0111 1110) is detected, flag byte detector 407 generates an output on line 420. As data is received, it is serially shifted through line register 401 and supplied to shift register 402.

The parallel contents of the QA-QH (eight bits) stages of register 401, in addition to being supplied to flag detector 407, are coupled to address detection circuit 406, zero bit delete control circuit 408, and abort detector 409. Only bits QA-QE are coupled to zero bit delete control circuit 408, while bits QF-QG are coupled to abort detector 409. The details of zero bit delete control circuit 408 and abort detector 409 are also shown in FIG. 5, to be described below. The output of flag byte detector 407 is coupled to the enable inputs of address detection circuit 406 and zero bit delete control circuit 408, as well as to receiver control circuit 405. Receiver control circuit 405 consists of straight forward combinational logic for supplying appropriate control or enabling signals to various components of the receiver as will be explained. For purposes of simplification, rather than describe the details of various gates and their interconnections of which control circuit 405 may be comprised, the description will treat the operational sequence of events which take place in the adapter, from which sequence control circuitry may be readily implemented. Receiver control circuit 405 is coupled to initializing control circuits, including receiver function latches, not shown, to receive necessary receiver enable signals from the processor. Receiver control circuit 405 is also coupled to the output flag byte detector 407 and address detection circuit 406 and to the enable input of line register 401. Zero bit delte control circuit 408 generates a block clock signal, BLK CLK, which is supplied to various components of the adapter to inhibit clocking for one bit time, upon the detection of an inserted dummy zero bit in the incoming serial data stream. By inhibiting clocking, or serial shifting, zero bit detele control circuitry 408 effectively destroys that bit in the data stream supplied to line register 401 during the bit inhibit period, so that inserted dummy zeroes are deleted.

Data disassembly circuit 418 is coupled to the parallel output stages of shift register 403 and carries out the separation of the incoming data stream into the prescribed bytes to be stored in the memory associated with the receiver through DMA. The details of the data disassembly circuit 418 do not form a part of the present invention and an explanation therefore is not necessary for the description of the present invention. In effect, data disassembly circuit 418 receives each byte to be coupled into memory from the QA-QH parallel outputs of shift register 403 as the data is clocked therethrough and each byte may be written into memory, via DMA.

As was described previously, the serial data stream shifted through the line register 401 is supplied to shift register 402. Register 402 is an eight bit serial-in, serial/-parallel-out register, as is register 403 which is connected to receive the serial output of shift register 402. The output of shift register 403 is coupled to an FCS generator 410 which generates an FCS character in accordance with the contents of the received serial data stream less the deleted dummy zero bits. The contents of FCS generator 410 and the stages of registers 402 and 403 are selectively coupled to FCS comparator 419. The loading of the FCS comparator 419 is controlled by the output of AND gate 411, inputs of which are coupled to flip-flop 412 and flag byte generator 407. Flip-flop 412 is set upon the generation of an address recognition output from address detection circuit 406. When flag byte detector 407 generates an output subsequent to an address recognition output from address detection circuit 406, AND gate 411 recognizes this as the detection of a closing flag byte and causes the contents of registers 402 and 403, which now contain the sixteen bit received FCS character, and the contents of FCS generator to be loaded into FCS comparator 419. The output of FCS comparator 419 is coupled to status register 413 which also receives other status signals from the receive control circuit 405 and abort detector 409 to advise the associate processor of the condition of the receiver at appropriate instances during the reception of a frame of data.

Before explaining the overall operation of the receiver, the details of the flag byte detector 407, zero bit delete control circuit 408, and abort detector 409, shown in FIG. 5, will be described.

Flag Byte Detector

As shown in FIG. 5, flag byte detector 407 consists of an AND gate 503, two inputs of which are coupled through inverters 501 and 502 to the QA and QH stages of line register 401. The other inputs are connected directly to the QB-QG outputs of line register 401. The output of AND gate 503 is connected to flip-flop 504. Whenever the contents QA-QH of line register 401 correspond to the binary character 0111 1110, AND gate 503 is enabled to cause flip-flop 504 to be set. The output of flip-fop 504 is coupled to line 420, enabling address detection circuit 406 and zero bit delete control circuit 408, until reset by receiver control circuit after timing out the address byte.

Zero Bit Delete Control

Zero bit delete control circuit 408 includes an AND gate 505, one input of which is the line 420 from flag byte detector 407, or address detection circuit 406 via OR gate 511. The QA-QE stages of line register 401 are also supplied as inputs to AND gate 505 along with the output of counter 507. Counter 507 is a six bit counter which receives the serial data clock and counts clock pulses when enabled by the output of AND gate 505. The output of AND gate 505 is also coupled to the enable input of a sixteen bit counter 506 which counts high speed clock pulses. The carry output of counter 506 is connected to one input of AND gate 508, the other input of which receives the incoming serial data stream. The output of AND gate 508 is connected to pulse generator 509 which generates a BLK CLK pulse for one data bit time.

Zero bit delete control circuit 408 is initially enabled upon the reception of a flag byte and then, if the adapter recognizes its address, it continues to monitor the received data stream until the final flag byte. Should AND gate 505 detect five consecutive one bits being serially clocked into stages QA-QE of line register 401, it enables counters 506 and 507. Counter 506 reaches a carry of a sixteen count during the sixth data bit QF. Counter 507 is loaded with a two's complement of six and inhibits or enables the zero deletion operation during the following bit time. AND gate 508 now looks at the next bit, i.e. QF, to determine whether a zero bit deletion is required or if an abort may follow. If QF is a zero bit, pulse generator 509 generates a BLK CLK pulse to inhibit loading of the next data bit into line register 401. Other shift clocking and counting circuitry is also temporarily disabled so that the dummary zero bit will not be processed as true data.

If QF is not a zero bit, i.e. it is a "one" bit, AND gate 510 looks at the next bit or seventh bit, QG. If QG is a zero bit, the adapter will have recognized a flag. If QG is a one bit, an abort character (11111111) will have been presumed to have been received and an abort condition is signalled by AND gate 510. The receiver is then reset by control circuit 405 and an abort status condition is stored in status register 413. Interrupt is then applied via the CCB to the processor.

Receiver Operation

The operation of the receiver portion of the adapter will be described with reference to FIG. 4 for an exemplary frame of transmitted data having initial flag, address, control, information, FCS, and terminating flag fields. The processor supplies appropriate receiver initializing signals and control circuit 405 readies the receiver to monitor the serial data line for data.

Flag Byte Detection

As the receiver is monitoring the serial data line input to the line register 401, it will continuously look for a flag byte with which each frame of data begins, since flag byte detection is a prerequisite to further action. Upon detecting the flag code (0111 1110) in the QA-QH stages of line register 401, flag byte detector 407 generates a flag detected signal on output line 420. The receiver is set up to assume that the next byte is an address byte and address detection is enabled by the flag detected signal on line 420 coupled to the enable input of address detection circuit 406. In addition, the output of flag byte detector is also coupled to zero bit delete control circuit 408, receiver control circuit 405 and one input AND gate 411; the other input of gate 411 is disabled since no recognition of an address byte has been effected.

Address Comparison

As the next byte (the address byte) following the flag byte is received, it is clocked into line register 401, the QA-QH stage contents of which are coupled to now enabled address detection circuit 406 to be compared with the stored receive address. When address detection circuit 406 recognizes its address in the QA-QH contents of register 401, an address detection output signal is generated. The address recognition output informs the receiver control circuit that the monitored frame of data is being directed to this receiver and demultiplexing of the data frame should proceed. Also, flip-flop 504 is reset while an enabling input is supplied through OR gate 511 to AND gate 505 of the zero bit delete control circuit. If the address byte failed to match the address code stored in address detection circuit 406, the flag byte detector 407 is reset so that the adapter begins again to monitor the line for a new communication and flag byte.

Address, Control, and Information Field Disassembly

Assuming that address detection circuit 406 has recognized the address byte, then receiver control circuit 405, in response to the address recognition signal, proceeds to enable FCS generator 410 after timing out the shift of the flag byte through register 403. Then, as the received address, control, and information (1) fields are clocked through shift registers 402 and 403, to be loaded into memory, they are extracted from the parallel output lines of the eight stages of shift register 403 via data disassembly circuit 418 and written into memory.

Frame Check Sequence Comparison

Upon the last byte of the I field having been clocked out through shift register 403, in accordance with the frame format of FIG. 2, shift register 403 will now contain the first eight bits of the sixteen bit FCS field, while shift register 402 will contain the second eight bits of the sixteen bit FCS field. Also, line register 401 will contain a closing flag byte. Flag byte detector 407 supplies a flag detected signal to AND gate 411 which is now enabled, since flip-flop 412 was set by address detection circuit 406, causing the FCS character in FCS generator 410 to be loaded to comparator 419 and compared with the contents of shift registers 402 and 402. The result of this comparison is supplied to status register 413. If the FCS characters match, the FCS character is loaded in memory via DMA, the system is reset and an end of frame interrupt is supplied to the processor; otherwise, an error condition is generated. Receiver control circuit 405 then supplies appropriate reset signals (not shown) to clear the receiver so that it may be set up to monitor the serial link for a new frame of data.

While we have shown and described one embodiment in accordance with the present invention, it is understood that the same is not limited thereto but is susceptibel of numerous changes and modifications as known to a person skilled in the art, and we therefore do not wish to be limited to the details shown and described herein but intend to cover all such changes and modifications as are obvious to one of ordinary skill in the art.

We claim:

1. In a communication system for transmitting a frame of data from a transmitting terminal over a serial communication line to a receiving terminal, a method of controlling the synchronization of said frame so that a transmitted frame of data may be properly disassembled at the receiving terminal comprising the steps of:

at said transmitting terminal,
generating prescribed flag characters made up of a series of bits unique to said flag character,
transmitting said flag character as the initial and terminating characters of which a frame is comprised,
during transmission of the remainder of said frame, selectively inserting into the frame prescribed dummy bits to prevent the transmitting frame from containing a series of bits unique to said flag character except at those positions in the frame where the occurrence of said flag character is intended; and
selectively generating a pescribed abort character made up of a series of bits unique to said abort character in response to a prescribed transmission condition, and transmitting said abort character while inhibiting the insertion of said dummy bits into the abort character.

2. A method according to claim 1, wherein said flag character is comprised of a first prescribed number of consecutive identical bits and said abort character is comprised of a second prescribed number of consecutive identical bits greater than siad first prescribed number.

3. A method according to claim 2, wherein said selective insertion step includes the steps of monitoring the frame as it is being transmitted and upon detecting a series of a third prescribed number of consecutive identical bits as part of said frame, said third prescribed number being less than said first prescribed number, inserting said dummy bit into said frame immediately following said series of said third prescribed number of bits.

4. A method according to claim 3, wherein said third prescribed number is one less than said first prescribed number.

5. A method according to claim 4, wherein said dummy bit removal step includes the steps of
monitoring the frame of data as it is received and, upon detecting a series of said third prescribed number of consecutive identical bits, examining the next bit immediately following said series of said third prescribed number of consecutive identical bits, and upon detecting said next bit to be an inserted dummy bit, causing said inserted dummy bit to be deleted from the received frame.

6. A method according to claim 5, wherein said frame of data monitoring step further comprises the steps of examining the bit immediately following said next bit upon detecting said next bit to be a bit other than an inserted dummy bit, and upon detecting each of said third prescribed number of bits, said next bit and said immediately following bit to be identical, recognizing these bits as an abort character and causing the reception of the frame of data to be aborted.

7. In a communication system for transmitting a frame of data from a transmitting terminal over a serial communication link to a receiving terminal, a method of controlling the synchronization of said frame so that a transmitted frame of data may be properly disassembled at the receiving terminal comprising the steps of:
   at said transmitting terminal,
   generating prescribed flag characters made up of a series of bits unique to said flag character,
   transmitting said flag character as the initial and terminating characters of which a frame is comprised,
   during transmission of the remainder of said frame, selectively inserting into the frame prescribed dummy bits to prevent the transmitted frame from containing a series of bits unique to said flag character except at those portions in the frame where the occurrence of said flag character is intended,
   at said receiving terminal,
   monitoring said serial communication link for the occurrence of a frame beginning flag character,
   examining information contained in a frame and controllably disassembling said frame until the detection of a frame-terminating flag character,
   at said transmitting terminal,
   generating a first diagnostic evaluation character, made up of a selected number of bits, in accordance with the contents of the frame, and transmitting said first diagnostic evaluation character immediately prior to transmitting said frame terminating flag character, and
   at said receiving terminal,
   selectively generating a second diagnostic evaluation character, made up of said selected number of bits, in accordance with the contents of the received frame, and
   upon detection of a frame ending flag character, comparing the received first diagnostic evaluation character with said second diagnostic evaluation character.

8. In a communication system for transmitting a frame of data from a transmitting terminal over a serial communication link to a receiving terminal, a control system for controlling the synchronization of said frame so that a frame of data assembled at, and transmitted from, the transmitting terminal may be properly disassembled at the receiving terminal comprising:
   at said transmitting terminal,
   first means for generating a prescribed flag character made up of a series of bits unique to said flag character,
   second means, coupled to said first means, for transmitting said flag character as the initial and terminating characters of which a frame is comprised,
   third means, coupled to said first and second means, for selectively inserting into the frame prescribed dummy bits to prevent the transmitted frame from containing a series of bits unique to said flag character except at those portions in the frame where the occurrence of a flag character is intended,
   fourth means, coupled to said second and third means, for selectively generating a prescribed abort character made up of a series of bits unique to said abort character in response to a prescribed transmission condition and causing said second means to transmit said abort character while inhibiting the insertion of dummy bits into the abort character by said third means,
   at said receiving terminal,
   fifth means, coupled to said serial communication link, for monitoring said link for a frame beginning flag character,
   sixth means, coupled to said fifth means, for controllably causing the disassembly of a frame of data until the detection of a frame-terminating flag character, and
   seventh means, coupled to said fifth and sixth means, for removing dummy bits inserted during the transmission of the frame.

9. A control system according to claim 8, wherein said flag character is comprised of a first prescribed number of consecutive identical bits and said abort character is comprised of a second prescribed number of consecutive identical bits greater than said first prescribed number.

10. A control system according to claim 9, wherein said third means includes means for monitoring the frame as it is being transmitted by said second means, and upon detecting a series of a third prescribed number of consecutive identical bits as part of said frame, said third prescribed number being less than said first prescribed number, causing a dummy bit to be inserted into said frame and transmitted immediately following said series of said third prescribed number of bits.

11. A control system according to claim 10, wherein said third prescribed number is one less than one first prescribed number.

12. A control system according to claim 8, further comprising,
   at said transmitting terminal,
   eighth means, coupled to said second means, for generating a first diagnostic evaluation character, made up of a selected number of bits in accordance with the contents of the frame, and causing said second means to transmit said first diagnostic evaluation character immediately prior to transmitting said terminating flag character, and
   at said receiving terminal,
   ninth means, coupled to said sixth means, for selectively generating a second diagnostic evaluation character, made up of a selected number of bits, in accordance with the contents of the received frame, and
   tenth means, coupled to said sixth means and said ninth means, for comparing the received first diagnostic evaluation character with said second diagnostic evaluation character.

13. A system according to claim 8, wherein said seventh means includes means for monitoring the frame of data as it is received and, upon detecting a series of third prescribed number of consecutive identical bits, and upon detecting said next bit to be an inserted dummy bit, causing said inserted dummy bit to be deleted from the received frame.

14. A system according to claim 13, further comprising, at said receiving terminal, eleventh means, coupled to said seventh means, for examining the bit immediately following said next bit, in response to said seventh means detecting said next bit to be a bit other than an inserted dummy bit, and upon detecting said following bit to be identical with said next bit, causing the reception of the frame of data to be aborted.

15. A system according to claim 14, wherein said second means comprises a serial-in, serial-out first shift register and said third means comprises means for monitoring selected stages of said first shift register and upon detecting the contents of said selected stages to contain said third prescribed number of identical bits, inhibiting the shifting of the frame into said first shift register for a period of one bit while causing a dummy bit to be inserted into said first shift register during said period.

16. A system according to claim 15, wherein said fourth means includes a second shift register serially coupled to said communication link and said seventh means includes means inhibiting serial shifting of the contents of said second shift register for one bit period upon the detection of an inserted dummy bit, thereby preventing said inserted dummy bit from being serially input to said second shift register, whereby said inserted dummy bit is deleted from the received frame of data.

* * * * *